(12) United States Patent
Seki et al.

(10) Patent No.: US 10,794,455 B2
(45) Date of Patent: Oct. 6, 2020

(54) TENSIONER

(71) Applicants: DAIDO KOGYO CO., LTD., Ishikawa (JP); NHK SPRING CO., LTD., Kanagawa (JP)

(72) Inventors: Hideaki Seki, Ishikawa (JP); Yoshio Yamada, Kanagawa (JP); Takao Kobayashi, Kanagawa (JP); Kazuhito Hiraoka, Kanagawa (JP); Shuji Takahashi, Kanagawa (JP)

(73) Assignees: DAIDO KOGYO CO., LTD., Ishikawa (JP); NHK SPRING CO., LTD., Kanagawa (JP)

(*) Notice: Subject to any disclaimer, the term of this patent is extended or adjusted under 35 U.S.C. 154(b) by 0 days.

(21) Appl. No.: 16/529,137

(22) Filed: Aug. 1, 2019

(65) Prior Publication Data

US 2019/0353227 A1    Nov. 21, 2019

Related U.S. Application Data

(63) Continuation of application No. PCT/JP2017/003737, filed on Feb. 2, 2017.

(51) Int. Cl.
*F16H 7/08*    (2006.01)

(52) U.S. Cl.
CPC ......... *F16H 7/08* (2013.01); *F16H 2007/081* (2013.01)

(58) Field of Classification Search
CPC . F16H 7/08; F16H 7/06; F16H 7/0846; F16H 7/18; F16H 2007/081
See application file for complete search history.

(56) References Cited

U.S. PATENT DOCUMENTS 4,886,483 A * 12/1989 Henderson ............ F16H 7/1218
474/135
5,244,438 A    9/1993 Goloyatai-Schmidt
(Continued)

FOREIGN PATENT DOCUMENTS

| JP | 5-280606  | 10/1993 |
| JP | 8-501619  | 2/1996  |

(Continued)

OTHER PUBLICATIONS

International Search Report dated May 9, 2017 in International (PCT) Application No. PCT/JP2017/003737.

*Primary Examiner* — Michael R Mansen
*Assistant Examiner* — Robert T Reese
(74) *Attorney, Agent, or Firm* — Wenderoth, Lind & Ponack, L.L.P.

(57) ABSTRACT

A tensioner includes a power spring, and a backup member being in contact with the power spring and supporting the power spring by acting an urging force in a direction opposite to a radial shift of the power spring in a direction in which the power spring is wound. The power spring is unwound in a condition in which an inter-plate frictional force of the power spring is small in a case where an urging force acting from a power spring to a tension member is greater than a load acting from the tensioner arm to the power spring and the power spring is wound in a condition in which the inter-plate frictional force of the power spring is large in a case where the urging force acting from the power spring to the tension member is smaller than the load acting from the tension member to the power spring.

9 Claims, 13 Drawing Sheets

(56) References Cited

U.S. PATENT DOCUMENTS

| | | | |
|---|---|---|---|
| 5,277,667 A | | 1/1994 | Gardner et al. |
| 2009/0105022 A1* | | 4/2009 | Cantatore ................. F16H 7/18 |
| | | | 474/111 |
| 2009/0111629 A1* | | 4/2009 | Kobara ................... F02B 67/06 |
| | | | 474/111 |
| 2016/0153529 A1* | | 6/2016 | Kobayashi ................ F01L 1/18 |
| | | | 123/90.47 |
| 2016/0252166 A1* | | 9/2016 | Noro ........................ F16H 7/08 |
| | | | 474/111 |
| 2017/0184183 A1* | | 6/2017 | Noro ........................ F16H 7/08 |
| 2018/0094708 A1* | | 4/2018 | Ikeda ....................... F16H 7/06 |
| 2019/0257392 A1* | | 8/2019 | Watanabe ............. F16H 7/0848 |

FOREIGN PATENT DOCUMENTS

| JP | 2000-18344 | 1/2000 |
|---|---|---|
| JP | 3670911 | 7/2005 |
| JP | 2016-38036 | 3/2016 |

\* cited by examiner

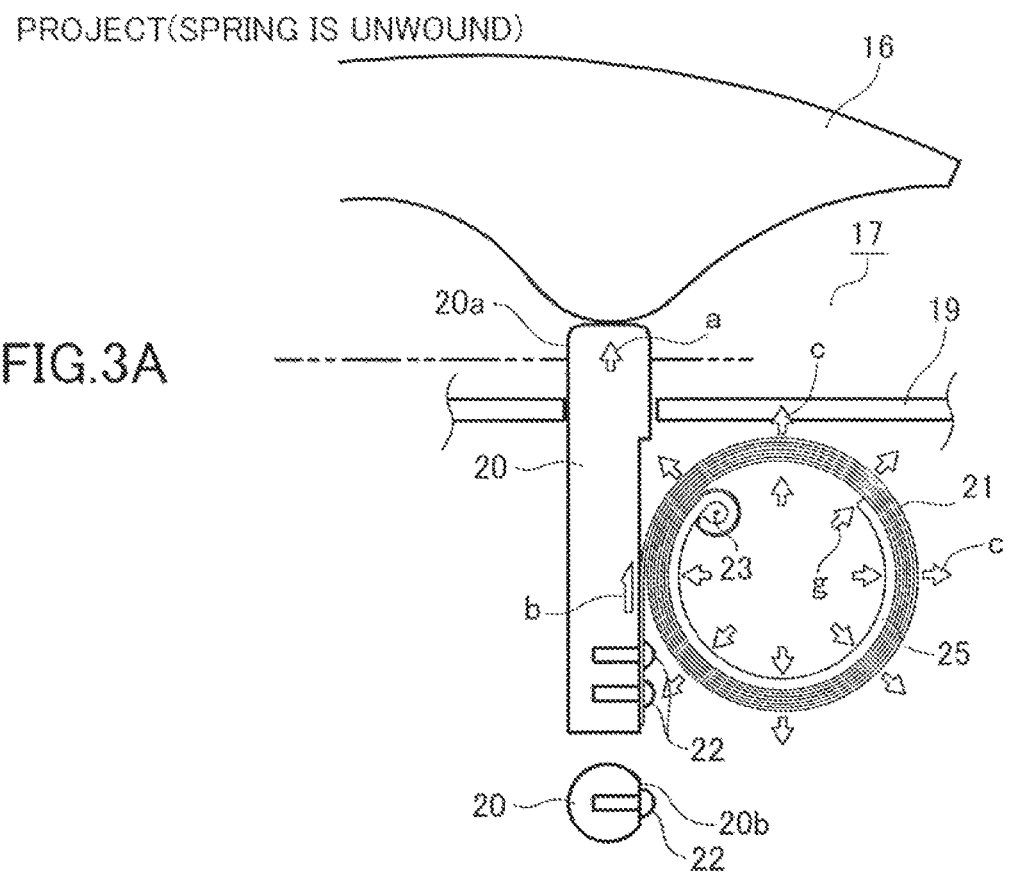
FIG.3A PROJECT(SPRING IS UNWOUND)
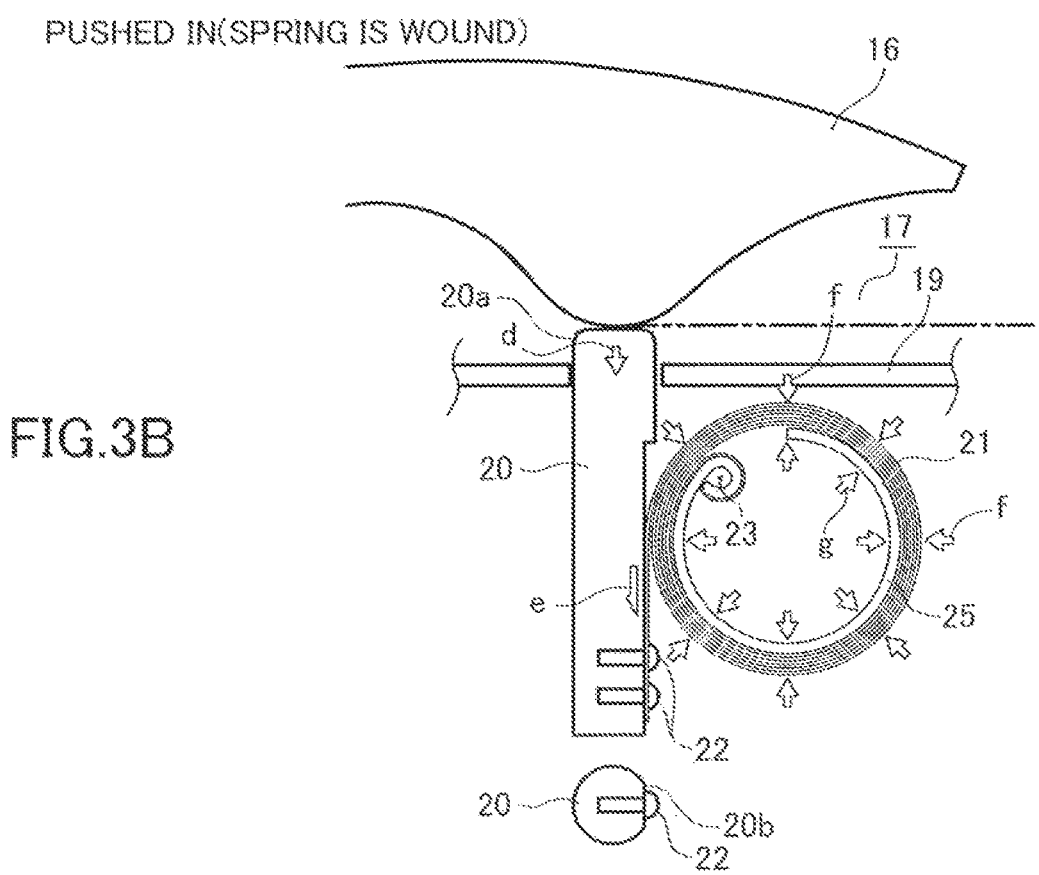
FIG.3B PUSHED IN(SPRING IS WOUND)

TENSIONER

CROSS-REFERENCE TO RELATED APPLICATIONS

This application is a Continuation of International Patent Application No. PCT/JP2017/003737, filed Feb. 2, 2017, which is hereby incorporated by reference herein in their entirety.

BACKGROUND OF THE INVENTION

Field of the Invention

The present invention relates to a tensioner configured to adjust a tension force of an endless chain, a belt or the like.

Description of the Related Art

In general, a transmission device using a wrap-around transmission body such as a chain, belt or the like adopts a tensioner that applies a tension force to a loose side thereof. In a timing chain transmission device transmitting a rotation of a crankshaft to a camshaft in particular, while a hydraulic tensioner that causes a hydraulic pressure of a hydraulic pump driven by an engine and an urging force of a return spring to act on a plunger is well known (see Japanese Patent No. 3670911), a mechanical tensioner using a power spring is also known (see Japanese Patent Application Laid-Open No. 2000-18344).

The tensioner of Japanese Patent No. 3670911 includes a plurality of circumferential grooves formed on an outer circumferential surface of the plunger, a guide groove defined on an inner circumferential surface of a cylinder, and a resister clip engaging with the guide groove and one of the plurality of circumferential grooves. Then, the tensioner suppresses the plunger, which has advanced by the hydraulic pressure or by the urging force of the return spring, from setting back by engaging the resister clip with the guide groove and the circumferential groove.

The tensioner in Japanese Patent Application Laid-Open No. 2000-18344 blocks a tensioner arm from setting back by pivotally supporting an eccentric cam to a tensioner arm (arm shoe), by causing an urging force of a power spring to act on the cam and by engaging a reverse rotation preventing claw to a tooth formed on the cam.

While the hydraulic tensioner described in Japanese Patent No. 3670911 has a high load absorbing ability and is often used in an automobile engine, it requires oil to absorb load. Then, there is a case where the plunger is late to project and is unable to synchronize with fluctuation of a chain load, thus causing an excessive chain vibration and an increase of a load, because a negative pressure is generated in taking the oil into the cylinder. Still further, in a case where a fed oil pressure is small in starting an engine, for example, it is unable to assure an internal pressure due to the deficiency of the oil quantity. Then, it causes such problems that the plunger is excessively pushed in, causing an excessive looseness of the chain and generating tap tones and tooth skipping due to flapping of the chain. In order to prevent such problems, a hydraulic tensioner provided with a lock mechanism suppresses the plunger from being pushed in by the lock mechanism when the fed oil pressure is low in starting the engine for example. However, because the lock mechanism receives the load instantly, it causes such problems of generating a high tension in the chain as an impact load and of generating tap tones because the tensioner is beaten.

The mechanical tensioner is often used in motorcycles such as an auto-bicycle and others. Besides the tooth and the reverse-rotation preventing claw as disclosed in Japanese Patent Application Laid-Open No. 2000-18344, there is one of blocking the set back by screwing a rotational shaft with a propulsion shaft (plunger), a load absorbability is low in either case. Due to that, they cause such problems of generating a high tension in the chain as an impact load and tap tones as the tensioner is beaten. It is thus difficult to use them for an engine generating a high load.

SUMMARY OF THE INVENTION

According to one aspect of the present invention, a tensioner includes a power spring urging so as to resist a tension member receiving a load from a wrap-around transmission body, a backup member being in contact with the power spring and supporting the power spring by acting an urging force in a direction opposite to a radial shift of the power spring in a direction in which the power spring is wound. The power spring is unwound in a condition in which an inter-plate frictional force of the power spring is small in a case where an urging force acting from the power spring to the tension member is greater than a load acting from the tensioner member to the power spring and the power spring is wound in a condition in which the inter-plate frictional force of the power spring is large in a case where the urging force acting from the power spring to the tension member is smaller than the load acting from the tension member to the power spring.

Further features of the present invention will become apparent from the following description of exemplary embodiments with reference to the attached drawings.

BRIEF DESCRIPTION OF THE DRAWINGS

FIG. 3A is a schematic diagram illustrating a moment when a plunger projects out (when a power spring is unwound).

FIG. 3B is a schematic diagram illustrating a moment when the plunger is pushed in (when the power spring is wound).

DESCRIPTION OF THE EMBODIMENTS

Figure 1:
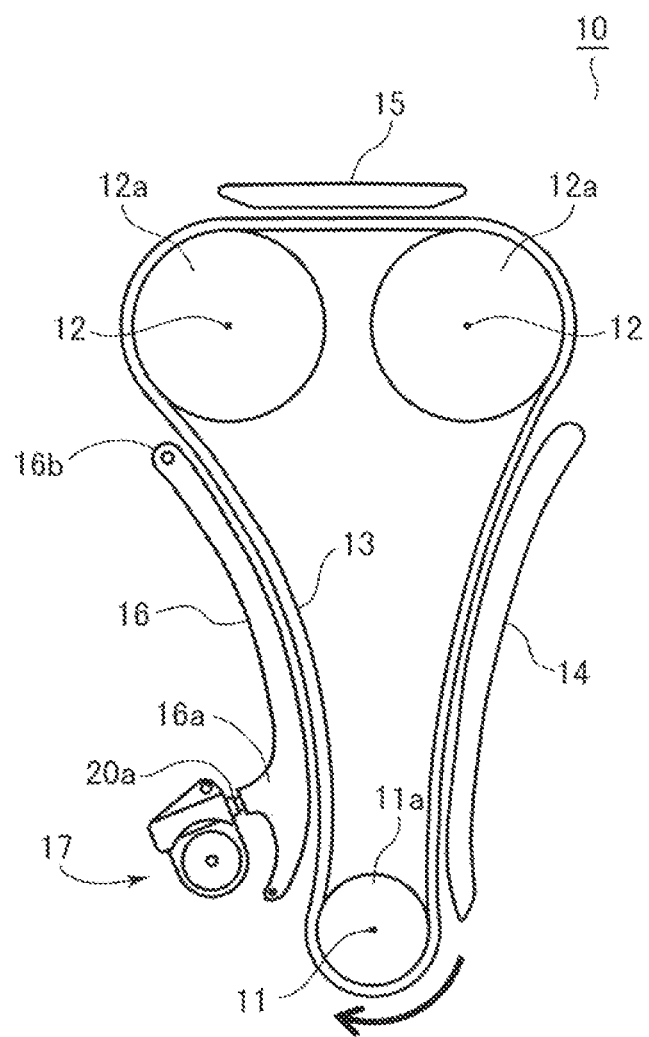
FIG. 1 is a front view illustrating a timing chain transmission to which the present disclosure is applied.

An embodiment of the present disclosure will be described below with reference to the drawings. As illustrated in FIG. 1, a timing chain transmission device 10 disposed within an engine includes a sprocket 11a fixed to a crankshaft 11, sprockets 12a fixed to two camshafts 12 and a timing chain 13 wound around the sprocket 11a and the cam sprockets 12a. The timing chain 13 serving as a wrap-around transmission body is in sliding contact with chain guides 14 and 15 at two tension sides thereof and is in sliding contact with a tensioner arm 16 serving as a tension member at its loose side. The chain guides 14 and 15 are fixed to an engine block, and one end of the tensioner arm 16 is swingably supported by a spindle 16b and another end is in contact with a plunger of a tensioner 17. Note that the timing chain 13 is applicable to any one of a silent chain, a roller chain, and a bush chain, and the spindle 16b of the tensioner arm 16 may be positioned upstream or downstream of a chain traveling direction.

Figure 2:
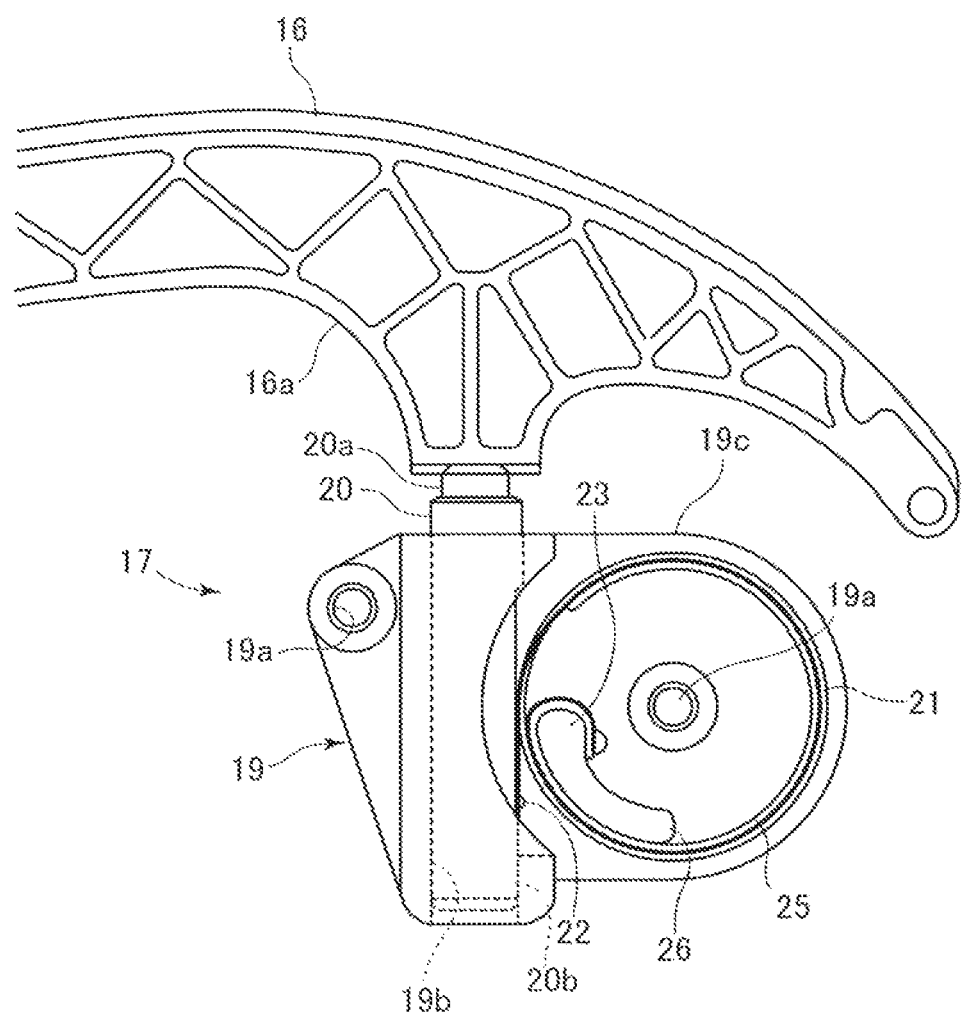
FIG. 2 is a front view illustrating a tensioner according to an embodiment of the present disclosure.

As illustrated in FIG. 2, the chain tensioner (referred to as a 'tensioner' hereinafter) 17 includes a body 19 which is fixed to a fixing member such as the engine block by means of mounting holes 19a and bolts. The body 19 includes a through hole 19b on one side and a case portion 19c on another side. The plunger 20 is slidably inserted through the through hole 19b, and the power spring 21 is stored in the case portion 19c. An outer end of the power spring 21 is fixed to an outer end anchor 22 provided together on a side surface 20b of the plunger 20 and an inner end thereof is fixed an inner end anchor 23 fixed to the body 19.

Disposed also within the case portion 19c so as to support an inner circumferential surface of the power spring 21 is a backup spring (member) 25 made of an arc-shaped leaf spring, and a guide piece 26 is also fixed so as to support an inner circumferential surface of one end (base end) of the backup spring 25. The inner end of the power spring 21 and a base end of the backup spring 25 are jointed to the guide piece 26 fixed to the case portion 19c, and the inner circumferential surface on the base end side of the power spring 21 and the backup spring 25 are both supported by the guide piece 26. Therefore, a base end portion of the guide piece 26 becomes an inner end anchor 23. The power spring 21 is disposed between the plunger 20 and the body 19 while being wound with a predetermined number of turns. One end of the plunger 20 partially projects out of the through hole 19b by an urging force of the power spring 21 and becomes a project portion (load receiving portion) 20a that abuts with an abutment portion 16a of the tensioner arm (tension member) 16.

Next, an operation of the tensioner 17 will be described. The inner end of the power spring 21 is fixed to the body 19 through the inner end anchor 23, and an urging force of the power spring 21 that tries to be unwound and to expand acts on the plunger 20. Thus, the tensioner 17 applies a predetermined tension force to the timing chain 13 through the tensioner arm 16. The tension force of the timing chain 13 changes due to fluctuation of the load of the cam accompanied with rotation of the engine, and a load acting on the tensioner arm 16 also changes so as to vibrate in response to a number of rotations of the engine. In a case where the load becomes smaller than a load (urging force) based on the power spring 21, i.e., in a case where a force of suppressing the power spring from expanding its diameter is small through the plunger, the plunger 20 projects (arrow a) as illustrated in FIG. 3A. Accordingly, the outer end anchor 22 moves in a direction of an arrow b, and the power spring 21 is unwound so as to expand its diameter as indicated by an arrow c. Because the diameter of the power spring 21 expands at this time, its inter-plate frictional force is small, the plunger 20 projects in a condition of a low resistance load.

In a case where the load from the tensioner arm 16 increases more than the urging force of the power spring 21, the plunger 20 is pushed in (arrow d) as illustrated in FIG. 3B. Accordingly, the outer end anchor 22 moves in a direction of arrow e, and the power spring 21 is wound such that its diameter is reduced as indicated by an arrow f. Because the diameter of the power spring 21 is reduced at this time, a frictional force between the plates is large and a large resistance load caused by the frictional force acts on the plunger 20.

Figure 4:
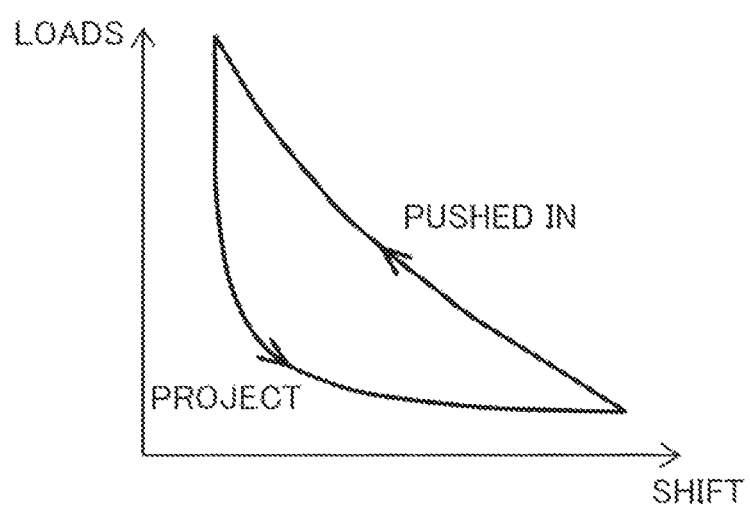
FIG. 4 is a deflection-load chart of the power spring.

As illustrated in FIG. 4, the loads of the tensioner 17 are different when the plunger projects (the arrow a) and when the plunger is pushed-in (the arrow d) and exhibits a hysteresis property. Thereby, the fluctuation of the load of the tensioner arm 16 accompanying to the vibration of the load of the timing chain 13 involved in the rotation of the engine is smoothly absorbed by buffering by the power spring of the tensioner 17 and by damping by the hysteresis property caused by the differences of the frictional forces when the plunger projects and when the plunger is pushed in.

In a case where the damping effect caused by the difference of the frictional force of the power spring 21 is insufficient, the backup spring (backup member) 25 is disposed like the present embodiment. The backup spring 25 is composed of a leaf spring supported by the guide piece 26 at its base end, wound once or by a plurality of times and having a front end portion which is a free end. The backup spring 25 is in contact with an inner circumferential surface of the power spring 21 and supports the power spring 21 by an urging force in a direction of an outer diameter as indicated by an arrow g. Thereby, as illustrated in FIG. 3A, because the power spring 21 expands its diameter as indicated by an arrow c, in the same direction with the arrow g, in a condition in which the power spring 21 is supported by the backup spring 25 as indicated by the arrow g, its inter-plate frictional force is small. In a case where the plunger 20 is pushed in as illustrated in FIG. 3B, the power spring 21 acts a large inter-plate frictional force by being interposed between the supporting force in the direction of the arrow g of the backup spring 25 and the deforming force of the power spring 21 in a direction of arrow f reducing its diameter. Thereby, a large difference of the inter-plate frictional force can be obtained at the moment of projection and the moment being pushed in, so that a required damping effect can be obtained.

In a case where the timing chain 13 is elongated by an aged deterioration and the timing chain 13 is loosened in starting the engine, for example, the load from the tensioner arm 16 is reduced and the plunger 20 projects by the urging force of the power spring 21. At this time, the timing chain 13 can assure an appropriate tension force because the power spring 21 projects the plunger 20 by quickly responding to the looseness of the timing chain 13 and the deformation in the diameter widening direction (arrow c) is small as described above. In the condition in which the plunger 20 projects out, the vibration of the load of the timing chain 13 attenuates by smoothly buffering the load vibration as described above.

Still further, while the tensioner 17 keeps the tension force of the timing chain 13 when the plunger 20 is pushed by the large inter-plate frictional force, the plunger 20 is pushed in by resisting against the large frictional resistance force in a case when an excessive load from the tensioner arm 16 continuously acts, so that it is possible to prevent the timing chain 13 from being continuously kept in an excessive tension state.

Note that while the outer end of the power spring 21 is fixed to the plunger 20 by the outer end anchor 22 and the inner end thereof is fixed to the body 19 by the inner end anchor 23 in the embodiment described above, the inner end anchor 23 may be fixed to the plunger 20 and the outer end of the power spring 21 may be fixed to the body 19.

Figure 5:
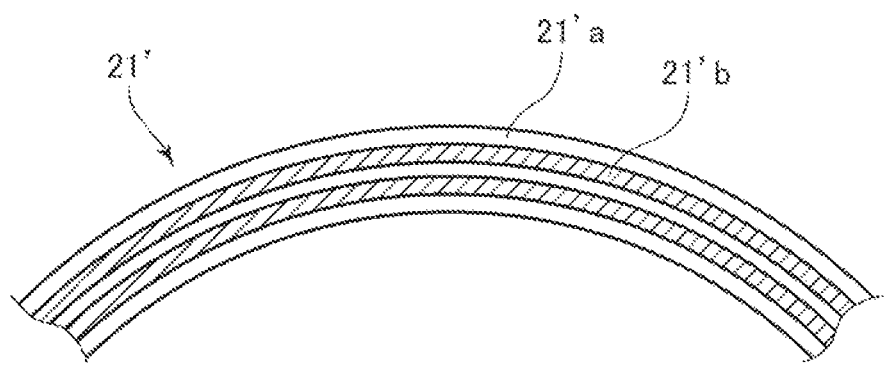
FIG. 5 is a front view illustrating an embodiment in which a functional material is interposed between plates of the power spring.

The power spring 21 described above is configured by winding a belt-like steel leaf spring having a rectangular section in spiral such that the leaf springs come into contact with each other. FIG. 5 illustrates a power spring 21' partially modified. The power spring 21' is formed by interposing a frictional member (high μ member) 21'$b$ between the spring band steels (leaf springs) 21'$a$. The power spring 21' can alter a friction coefficient μ that increases the inter-plate frictional force by the friction member 21'$b$ for example. It is noted that what is interposed between the leaf springs 21'$a$ is not limited to be the frictional member (high μ member) and may be another functional foreign member (material) such as what improves wear resistance and what suppresses heat generation.

Figure 6A:
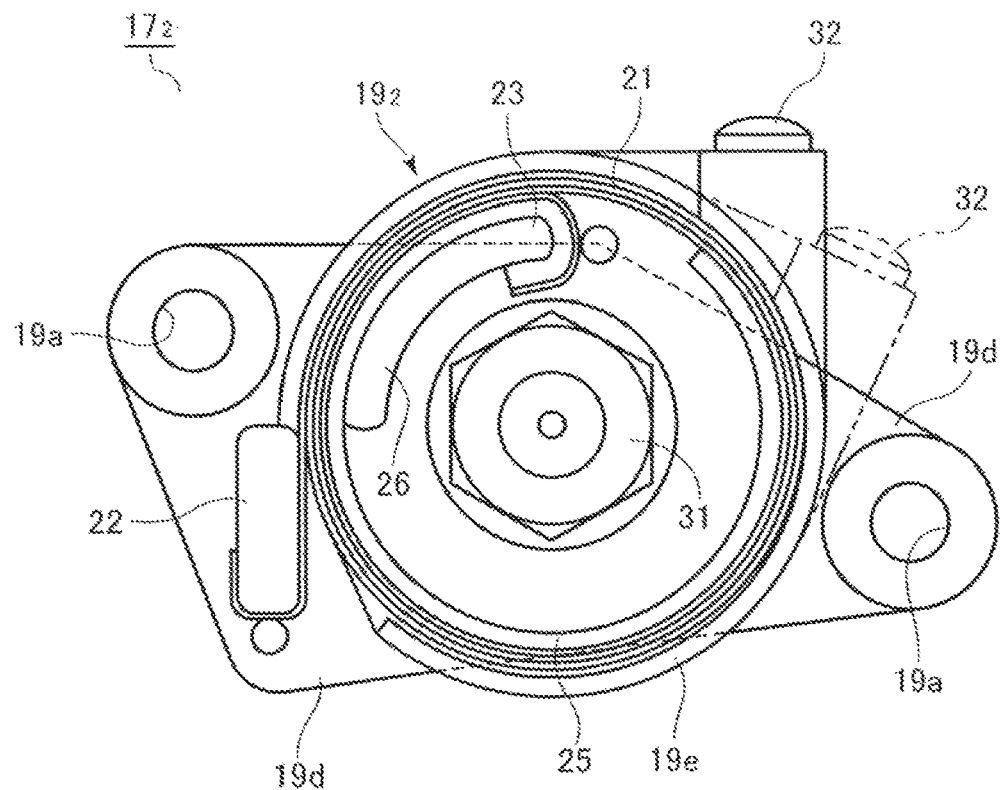
FIG. 6A is a front view illustrating another embodiment.
Figure 6B:
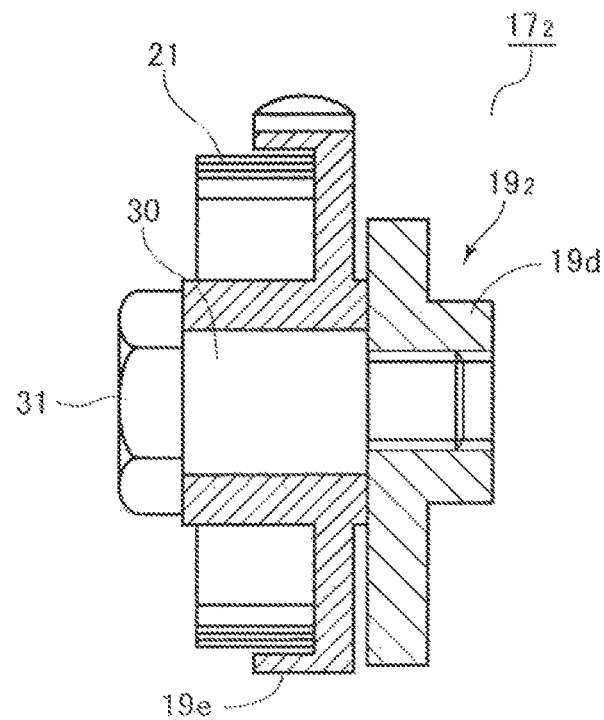
FIG. 6B is a side elevation illustrating the other embodiment.

Next, another embodiment of the present disclosure will be described. As illustrated in FIGS. 6A and 6B, a tensioner $17_2$ includes a body $19_2$. The body $19_2$ includes a fixing portion 19$d$ and a movable portion 19$e$ fixed to a fixing member such as an engine block by means of mounting holes 19$a$. A boss of the case portion (movable portion) 19$e$ is rotatably supported to the fixing portion 19$d$ by a rotation shaft 30 and is fixed by a bolt 31. The power spring 21 is stored and the guide piece 26 is fixed in the movable portion 19$e$. One end portion of the guide piece 26 fixes the base end portion of the backup spring (member) 25 and the base end portion of the power spring 21, thus composing an inner end anchor 23. The backup spring 25 composed of an arc-shaped leaf spring is in contact with an inner circumferential surface of the power spring 21 to support the power spring 21. An outer end of the power spring 21 is fixed to the fixing portion 19$d$ by an outer end anchor 22.

A project portion (load receiving portion) 32 projecting out of an inner circumferential surface of the movable portion 19$e$ and corresponding to the plunger is integrally formed. The project portion 32 is in contact with the tension arm (tension member) 16. The power spring 21 is mounted between the inner and outer end anchors 22 and 23 while being wound by predetermined turns. Accordingly, the power spring 21 acts a predetermined urging force onto the tensioner arm (tension member) 16 in contact with the project portion 32.

The tensioner 172 of the rotation winding type causes such that a rewinding urging force of the power spring 21 in which the outer end anchor 22 is fixed to the fixing portion 19$d$ acts so as to rotate the case portion 19$e$ counterclockwise and to act on the tensioner arm 16 from the project portion 32. In a case where a load acting on the project portion 32 by the power spring 21 is greater than a load from the tensioner arm from the timing chain, the power spring 21 deforms so as to unwind. The deformation in this direction (in projecting) projects the load receiving portion 32 smoothly and quickly with a small resistance because the diameter of the power spring 21 is expanded and the inter-plate frictional force is small.

Figure 7:
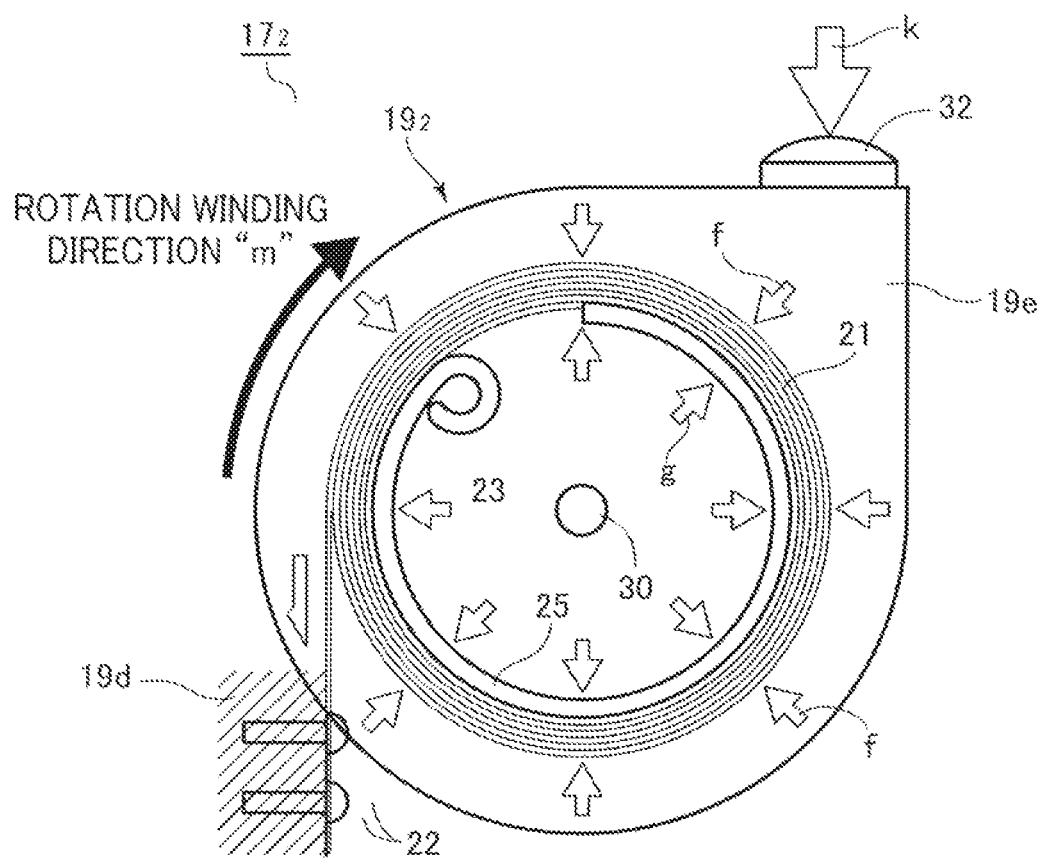
FIG. 7 is a schematic diagram illustrating a function of another embodiment.

In a case where a load k acting from the tensioner arm to the project portion (load receiving portion) 32 due to the timing chain is greater than the urging force of the power spring 21, the case portion 19$e$ rotates in a rotation winding direction m as illustrated in FIG. 7 and the power spring 21 shifts in the winding direction. By being interposed between a force in the diameter reducing direction f caused by winding thereof and a force in the direction g supporting the inner circumferential surface by the backup spring 25, an inter-plate frictional force increases and the power spring 21 receives a large resistance by the frictional force. Thereby, the vibration involved in the fluctuation of load of the timing chain is buffered by the tensioner $17_2$ and is smoothly damped by the property based on the difference of the frictional forces.

The tensioner arm (tension member) quickly shifts and applies an adequate tension force to the timing chain in the same manner with the shift in the projection direction having less inter-plate frictional force for the elongation of the timing chain caused by an aged deterioration and looseness of the timing chain in starting the engine. For the move in the opposite direction (push-in direction), a large resistance acts because the large inter-plate frictional force acts on the power spring 21.

Figure 8A:
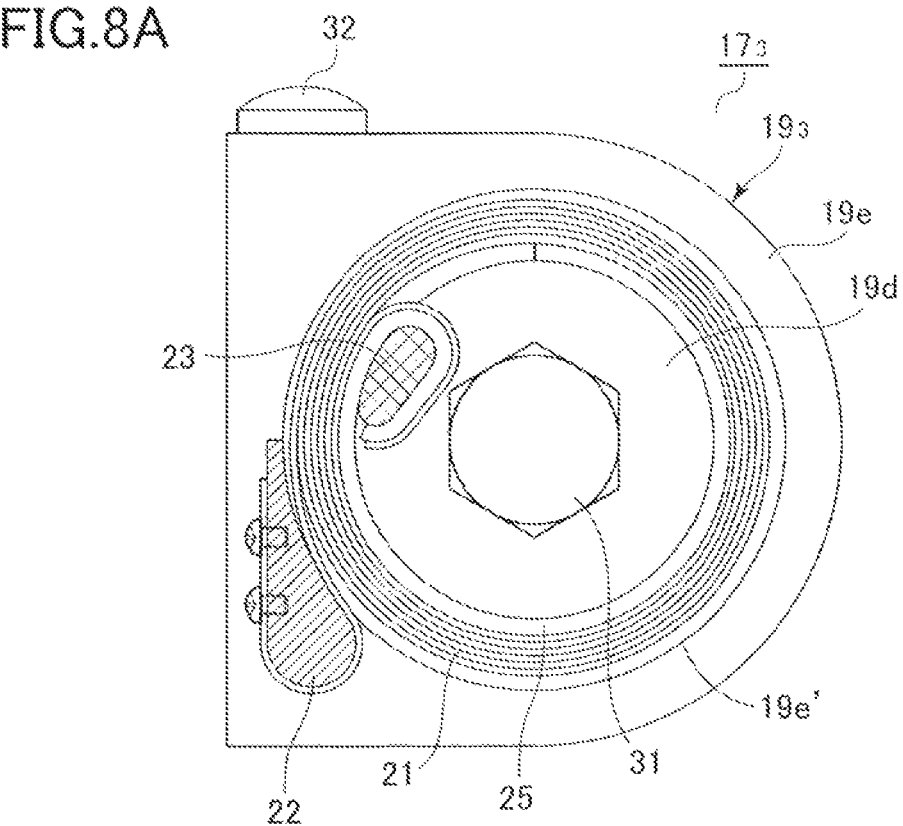
FIG. 8A is a front view illustrating a still other embodiment.

Next, a partially modified embodiment of the tensioner $17_2$ of the rotation winding type will be described. As illustrated in FIGS. 8A and 8$b$, a tensioner $17_3$ includes a body $19_3$. The body $19_3$ includes a circular fixing portion (boss) 19$d$ and a movable portion 19$e$, and a center part of the fixing portion 19$d$ is fixed to a fixing member 34 such as an engine block by means of a bolt 31. The movable portion 19$e$ is turnably supported to the fixing portion 19$d$ by means of a bearing 35, and a case portion 19$e'$ is integrally fixed to the movable portion 19$e$.

An inner end anchor 23 serving also as a guide piece is integrally fixed on a surface side of the fixing portion 19$d$, and an inner end of the power spring 21 with a predetermined number of turns and a backup spring 25 formed of an arc-shaped leaf spring are fixed to the inner end anchor 23. The power spring 21 is supported by the backup spring 25 at its inner circumferential surface, is stored in the case portion 19$e'$ integrated with the movable portion 19$e$, and an outer end thereof is fixed to an outer end anchor 22. A project portion (load receiving portion) 32 projecting outside is formed integrally at one side corner of the movable portion 19$e$ and abuts with the tensioner arm (tension member) 16.

That is, while the tensioner $17_2$ illustrated in FIGS. 6 and 7 is what one end fixed to the fixing portion 19$d$ is the outer end (22) of the power spring 21 and the other end fixed to the movable portion 19$e$ is the inner end (23) of the power spring 21, the tensioner $17_3$ is different in that one end fixed to the fixing portion 19$d$ is the inner end (23) of the power spring 21 and the other end fixed to the movable portion 19$e$ is the outer end (22) of the power spring 21. Accordingly, the tensioner $17_3$ operates such that an unwinding urging force of the power spring 21 fixed to the fixing portion 19$d$ by the inner end anchor 23 rotates the movable portion 19e counterclockwise and operates in the same manner with the previous embodiment.

Next, a still different embodiment of the present disclosure will be described with reference to FIGS. 9A and 9B. A tensioner $17_4$ includes a body $19_4$ disposed such that arc-shaped inner circumferential surfaces face with each other. The body $19_4$ includes a fixing portion 19g having mounting holes 19a and fixed to a fixing member such as an engine block and a movable portion 19h turnably supported by pin (pivot portion) 37 on one side portion of the fixing portion 19g. The fixing portion 19g and the movable portion 19h have approximately semi-circular storage surfaces 39 and 40 facing with each other. A side surface on an opposite side of the pin 37 is configured such that a protruding portion 41 is provided in the movable portion 19h and a groove portion 42 is provided in the fixing portion 19g. The protruding portion 41 can engage with the groove portion 42 with each other. It is noted that the positions of the protruding portion 41 and the groove portion 42 may be opposite in the fixing portion and the movable portion.

A power spring 21 is mounted in both storage surfaces 39 and 40 facing with each other. Still further, a backup spring 25 formed of a ringed leaf spring is attached to an inner circumferential surface of the power spring 21. Slip preventing plates 43 are attached at both side surfaces in a front and rear direction of the fixing portion 19g to prevent the power spring 21 and the backup spring 25 from slipping out of the storage surfaces 39 and 40. A bolt serving as a project portion (load receiving portion) 32 is screwed on an upper part on a side surface opposite from the pin 37 of the movable portion 19h.

While an outer end 21u and an inner end 21v of the power spring 21 are in a free-end condition not fixed, an outer circumferential surface contact portion S in contact with the storage surface 40 of the movable portion 19h of the power spring 21 is fixed by a frictional force in a condition in which a load from the tensioner arm 16 acts on the project portion 45. The backup spring 25 is configured such an urging force in the outer diameter direction thereof acts so as to come into contact with the inner circumferential surface of the power spring 21 and is not fixed. It is noted that the outer end 21u of the power spring 21 may be fixed to the movable portion 19h.

Because the present embodiment is configured as described above, the power spring 21 is mounted within the both storage surfaces 39 and 40 while reducing its diameter and being wound by a predetermined number of turns such that the project portion 32 comes into contact with the tensioner arm 16 and so as to correspond to a load from the tensioner arm (tension member) 16.

Figure 9A:
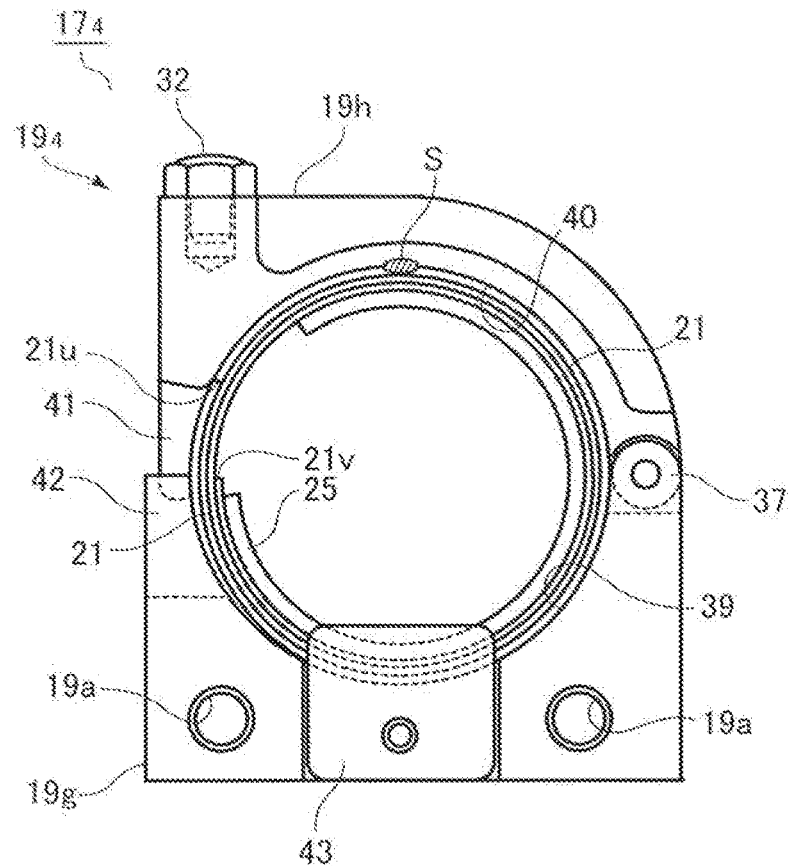
FIG. 9A is a front view illustrating a moment when a project portion projects (when a power spring is unwound) in a different embodiment.

In a condition in which a load from the tensioner arm 16 based on the timing chain 13 is smaller than a load acting on the project portion 32 based on the power spring 21, the power spring 21 expands its diameter as illustrated in FIG. 9A, the movable portion 19h turns clockwise centering on the pin 37 and the project portion 32 shifts in the projecting direction such that a predetermined tension force acts on the tensioner arm 16.

Figure 9B:
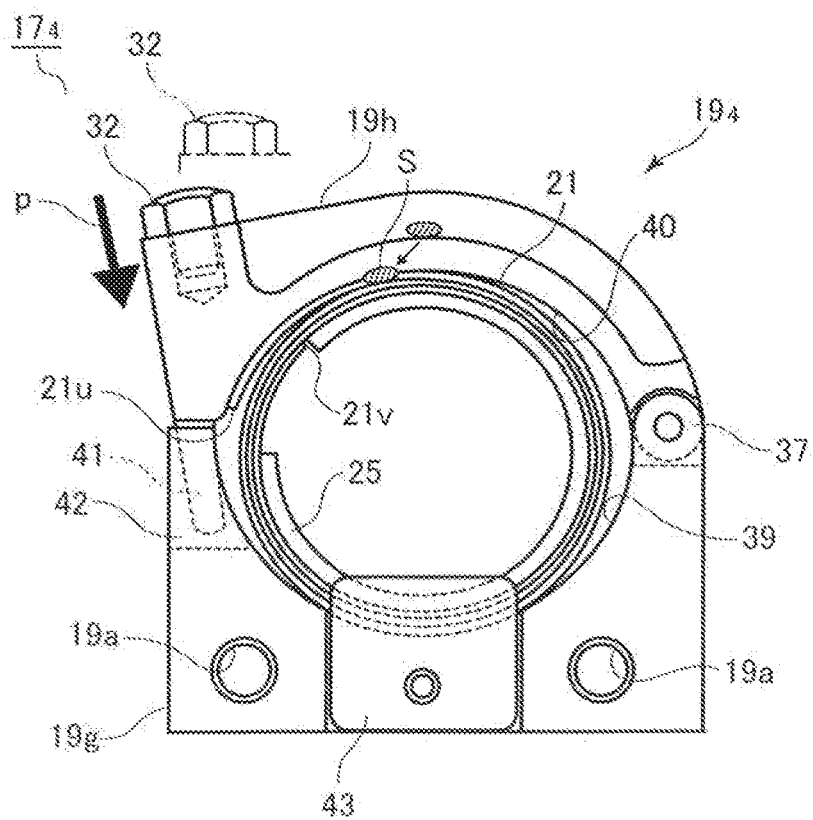
FIG. 9B is a front view illustrating a moment when the project portion is pushed in (when the power spring is wound) of the different embodiment.

In a case where the load from the tensioner arm 16 is greater than the load generated by the power spring 21, the movable portion 19h turns in a direction of an arrow p (pushed in) centering on the pin 37 as illustrated in FIG. 9B. Because the storage surface 40 of the movable portion 19h approaches to the storage surface 39 of the fixing portion 19g and the arc surface is reduced, the power spring 21 reduces its diameter and is wound by resisting against the support of the backup spring 25. At this time, the backup spring 25 deforms such that the both ends thereof approach, and the inner end 21v of the power spring 21 also moves in the winding direction. Because the outer end 21u side of the power spring 21 is in frictional contact with the storage surface 40, the contact portion S is drawn along the move of the movable portion 19h.

Accordingly, the inter-plate frictional force of the power spring is different in expanding the diameter of the power spring as illustrated in FIG. 9A from that in reducing the diameter of the power spring as illustrated in FIG. 9B, and the great inter-plate frictional force acts in reducing the diameter. Thereby, similarly to what described above, the vibration accompanied to the fluctuation of load of the timing chain is buffered by the tensioner $17_3$ and is smoothly absorbed, damped also in the tensioner $17_4$. The tensioner $17_4$ quickly adjusts the tension force by unwinding the power spring 21 in the condition in which the frictional resistance is small in response to the elongation caused by the aged deterioration of the timing chain 13 and to the looseness of the timing chain in starting the engine. It is also possible to prevent an excessive tension of the timing chain from being continued.

Figure 10:
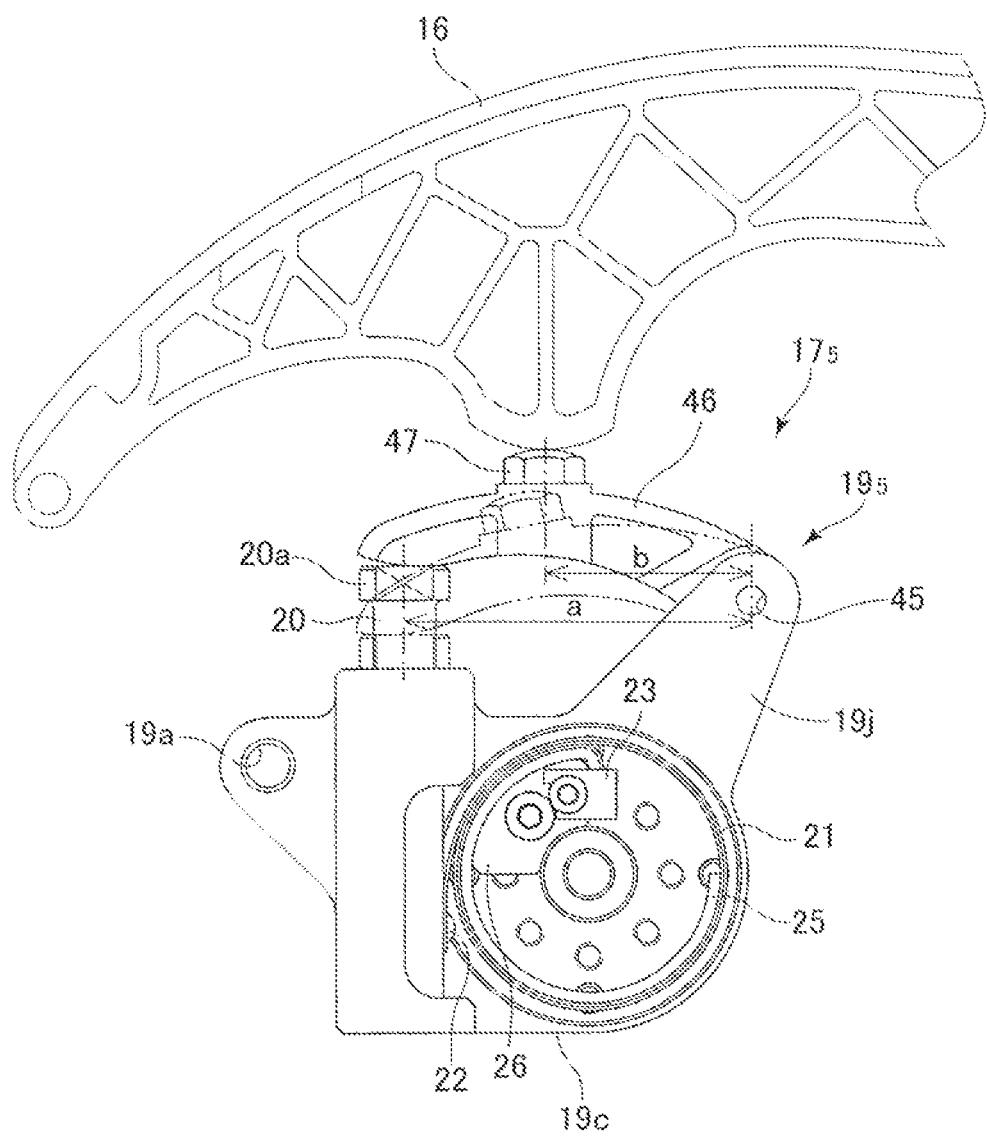
FIG. 10 is a front view illustrating a still other different embodiment.

Next, a further modified embodiment of the present disclosure will be described. As illustrated in FIG. 10, basic parts of the tensioner are the same with those the tensioner 17 as illustrated in FIGS. 2 and 3, they are denoted by the same reference numerals and their description will be omitted in the present embodiment. A body 195 of a tensioner $17_5$ is formed integrally with an arm 19j, on a side opposite to the plunger 20, extending outside in the same direction with the projecting direction of the plunger. A lever 46 is swingably supported by a pin (pivot portion) 45 at an edge of the arm 19j. An edge portion of the lever 46 is in contact with an edge project portion (first project portion) 20a of the plunger 20 and a bolt (second project portion) 47 that projects upward and is in contact with the tensioner arm (tension member) is screwed to an intermediate portion thereof. Accordingly, a projecting force based on the urging force of the power spring 21 acts on the lever 46 from the first project portion 20a at the edge of the plunger and acts further on the tensioner arm 16 from the second project portion 47 of the lever 46.

A load acting on the first project portion 20a and a load acting on the second project portion 47 can be changed by a lever ratio (b/a) of the lever 46. In a case of the present embodiment, the load at the first project portion 20a caused by the power spring 21 is changed to a/b (about twice) at the second project portion 47 by the lever 46 and acts on the tensioner arm 16. Therefore, the power spring 21 resists against the load of the tensioner arm 16 based on the tension force from the chain by b/a (about a half) with the urging force thereof, and the inter-plate frictional force is reduced accordingly. Thereby, the tensioner $17_5$ can improve its durability by reducing abrasion from being generated by the inter-plate friction of the power spring by resisting against the chain tension force by the inter-plate frictional force which is small as compared to one having no lever.

The change of the load at the load receiving portion by the lever ratio of the lever is applicable not only to the embodiment (17, 175) as illustrated in FIG. 10 but also to other tensioners such as the tensioner $17_2$, $17_3$ and $17_4$ in the same manner. Still further, while the project portion 32 is disposed at the edge portion of the movable portion 19h on the side opposite to the pin 37 in the tensioner 174 as illustrated in FIGS. 9A and 9B, the load acting on the project portion can be changed in the same manner without using the lever 46 described above by disposing the project portion 32 at an arbitral position such as an intermediate portion of the movable portion 19h where a distance from the pin 37 is different. Note that the same also applies to the other tensioners $17_2$ and $17_3$.

Next, another embodiment of the present disclosure will be described with reference to FIG. 11. It is noted that while the present embodiment is what the backup spring (member) is modified and is applicable to any tensioners, the same members will be denoted by the same reference numerals and their description will be omitted because this embodiment will be described with the embodiments applied to the tensioner illustrated in FIGS. 2 and 3. The backup spring (25) of the previous embodiment is composed of the leaf spring supporting the inner circumferential surface of the power spring 21 and having the urging force in the diameter widening direction. While the backup spring may be expressed as a spring, it will be expressed as a backup member $25_2$ because it is applicable other than the spring in the present embodiment.

The backup member $25_2$ includes two arms 51 and 52 rotatably supported by a pin (pivot portion) 50 to the case portion 19c which is a fixing portion of the body $19_6$ and a torsion spring 53 which urges such that the front edges of these arms 51 and 52 separate from each other. The pin 50 is disposed on a side opposite to the plunger 20, and the torsion spring 53 is disposed so as to wind a coil portion 53a around the boss 19v which is a center part of the case portion 19c. Both front end portions 53b and 53c of the torsion spring 53 are engaged with front engage portions of the arms 51 and 52, respectively. The inner end of the power spring 21 is fixed to a front portion of one arm 52, thus becoming an inner end anchor 23, and the outer end of the power spring 21 is fixed to the plunger 20 by an outer end anchor 22. The pair of arms 51 and 52 is semi-circular arc shaped, respectively, and support the inner circumferential surface of the power spring 21 by an outer circumferential surface thereof and urge the power spring 21 so as to expand its diameter by the torsion spring 53.

Accordingly, similarly to the backup spring (member) composed of the leaf spring described above, the backup members face in the direction of winding the power spring 21 and increase an inter-plate frictional force while interposing the power spring 21. It is noted that the member urging the pair of arms 51 and 52 in the diameter widening direction is not limited to the torsion spring 53 and may be a coil spring compressed between the both arms 51 and 52 and another device such as a hydraulic unit that operates so as to separate the both arms. In short, it is operative if the urging force acts on the both arms in the diameter widening direction. Still further, while the both arms 51 and 52 are made of non-elastic members and are urged by the urging member (53), the arms 51 and 52 themselves may be made of an elastic member such as a leaf spring and a torsion spring so as to have urging force by the arms themselves.

Figure 12:
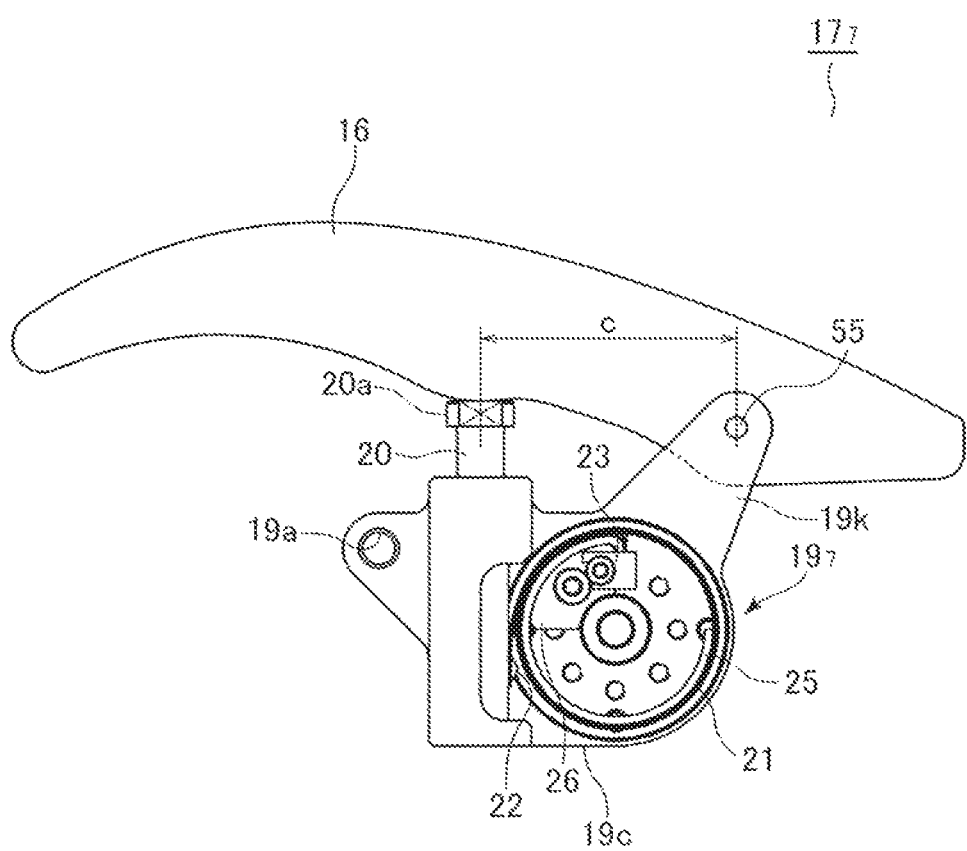
FIG. 12 is a front view illustrating a still other embodiment

A further modified embodiment of the present disclosure will be described with reference to FIG. 12. While the present embodiment is what changes the load by the lever ratio as illustrated in FIG. 10, the present embodiment is what changes a tensioner arm (tension member) itself to a lever. Because the present embodiment will be described based on the embodiment as illustrated in FIGS. 2 and 3 to which the tensioner of any embodiment described above is applicable, the same members will be denoted by the same reference numerals and description thereof will be omitted. As illustrated in FIG. 12, a tensioner $17_7$ includes a body $19_7$ fixed to the fixed member, and an arm 19k extending outside in the projecting direction of the plunger is formed integrally with the body $19_7$ on a side opposite to the plunger 20. The tensioner arm (tension member) 16 is swingably supported by the pin (pivot portion) 55 at the edge of the arm 19k. That is, the body $19_7$ has the same configuration with the body $19_5$ of the tensioner $17_5$ as illustrated in FIG. 10, and what is different is that the lever (46) swigably supported by the arm 19k (19j) is the tensioner arm 16.

In the present embodiment, the tensioner arm 16 is swingably attached by the pin 55 at the edge of the arm 19k of the body $19_7$. An urging force of the power spring 21 of the tensioner $17_7$ acts on the tensioner arm 16 from the edge project portion 20a of the plunger 20. The urging force of the power spring 21 acts on the tensioner arm 16 by a link ratio based on a distance c between the pin 55 and the project portion 20a from the plunger project portion 20a to the tensioner arm 16 as against the load of the tensioner arm 16 from the chain. Thereby, the urging force of the power spring 21 as a resistant force against the load acting on the tensioner arm 16 from the chain can be changed by the distance c by arbitrarily setting the distance.

Figure 13:
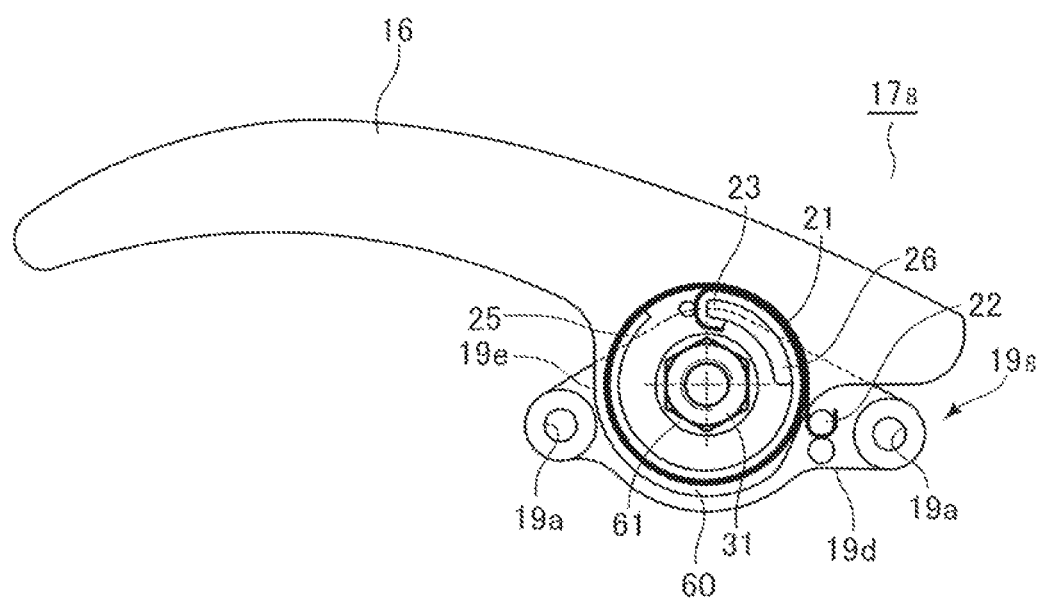
FIG. 13 is a front view illustrating a still different embodiment.

FIG. 13 illustrates a still modified embodiment. In the present embodiment, a movable portion of a tensioner $17_8$ is disposed on a tensioner arm 16. Similarly to what illustrated in FIGS. 6A and 6B, a body $19_8$ of the tensioner $17_8$ includes a movable portion 19e and a fixing portion 19d. The fixing portion 19d is attached to the fixed member through mounting holes 19a. The movable portion 19e is formed integrally with the tensioner arm 16. That is, the tensioner arm 16 is formed integrally with a case portion 60 and a boss portion 61 forming the movable portion 19e at one end thereof. The boss portion 61 is loosely fitted to a shaft provided on a fixing portion 19d, is turnably supported and attached to the fixing portion 19d by a bolt 31 (see FIGS. 6A and 6B). The power spring 21 is stored in the case portion 60, and an inner end of the power spring 21 is fixed by a guide piece 26. The inner end of the power spring 21 and the backup spring (member) 25 are both fixed to the guide piece 26, thus composing an inner end anchor 23. An outer end of the power spring 21 is fixed by an outer end anchor 22 provided on the fixing portion 19d.

Accordingly, the power spring 21 is mounted with a predetermined winding force between the case portion 60 of the tensioner arm 16 forming the movable portion 19e and the fixing portion 19d and urges the tensioner arm 16 clockwise. In a case where a load acting on the tensioner arm 16 by the timing chain is smaller than an urging force of the power spring 21, the tensioner arm 16 turns counterclockwise and the power spring 21 deforms so as to be unwound. Due to the deformation in that direction, the power spring 21 expands its diameter and smoothly and quickly rotates with a small inter-plate frictional force and a small resistance. In a case where the load acting on the tensioner arm 16 by the chain is greater than the urging force of the power spring 21, the tensioner arm 16 turns clockwise and the power spring deforms in the direction of being wound. Due to the deformation of this direction, the power spring 21 reduces its diameter, increases an inter-plate frictional force because the backup spring 25 is sandwiched, and acts a large resistance clockwise on the tensioner arm 16.

According to the present embodiment, the tensioner $17_8$ can be compacted because the movable portion 19e of the tensioner $17_8$ is formed integrally with the tensioner arm 16. Still further, because the urging force of the power spring 21 of the tensioner $17_8$ directly acts on the tensioner arm (tension member) 16, the action is directional and enables quick response.

Figure 8B:
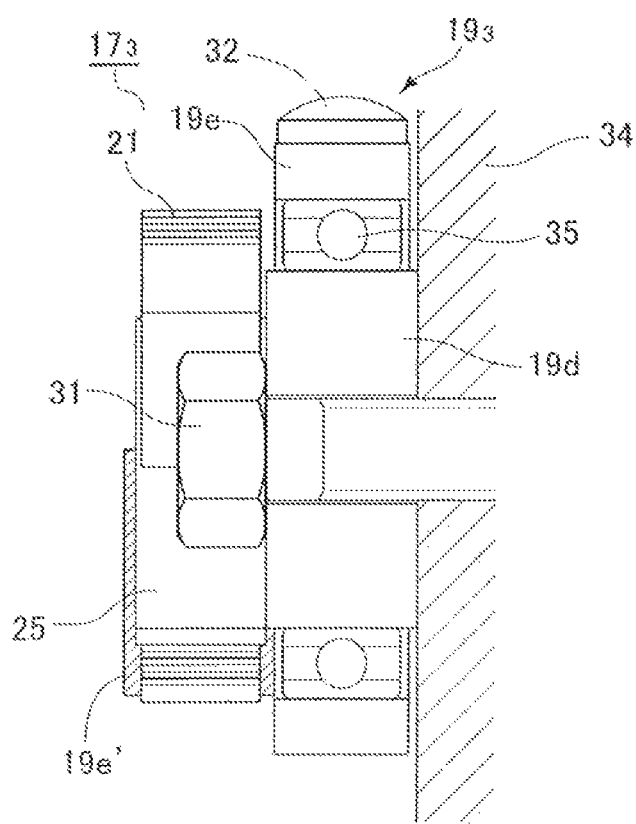
FIG. 8B is a side elevation illustrating the still other embodiment.

It is noted that the arrangement in which the tensioner is disposed on the side of the tensioner arm is not limited to the tensioner $17_2$ based on FIGS. 6A, 6B and 7 that is modified as illustrated in FIG. 13, it is applicable also to another embodiment. That is, in the tensioner 17 as illustrated in FIGS. 2, 3A and 3B, the body 19 may be disposed on the tensioner arm (tension member) 16 and the edge project portion 20a of the plunger 20 may be brought into contact with the fixing member. Still further, in the tensioner $17_3$ as illustrated in FIGS. 8A and 8B, the body $19_3$ may be disposed on the tensioner arm (tension member) 16 and the project portion 32 of the movable portion 19e may be brought into contact with the fixing member. In the same manner, in the tensioner $17_4$ as illustrated in FIGS. 9A and 9B, the body $19_4$ may be disposed on the tensioner arm (tension member) 16 and the project portion 32 of the movable portion 19h may be brought into contact with the fixing member.

It is noted that while the embodiments described above have been applied to the tensioner of the timing chain, the present disclosure is not limited to such case and may be applicable to other chains driven by an engine such as a balancer and a hydraulic pump and may be applicable also to a belt such as an auxiliary driving belt. As a belt tensioning tensioner, the tensioner of the present disclosure is applicable to a tension pulley and is applicable to a tensioner adjusting a tension force of all kinds of wrap-around transmission bodies. That is, in the embodiments described above, the tensioner arm 16 is not limited to what having an arcuate shape having a sliding surface on the chain 13 and may be a tensioner arm having a tension pulley at an edge. In short, the tension member may be any tension member tensioning the wrap-around transmission body.

A tensioner of the present disclosure comprises a power spring (21) urging so as to resist a tension member (16) that receives a load from a wrap-around transmission body (13). The power spring (21) is unwound in a condition in which an inter-plate frictional force of the power spring is small in a case where an urging force acting from the power spring to the tension member is greater than a load acting from the tension member (16) to the power spring (21) and the power spring is wound in a condition in which the inter-plate frictional force of the power spring is large in a case where the urging force acting from the power spring to the tension member is smaller than the load acting from the tension member to the power spring.

With reference to FIGS. 1 through 3 and to FIGS. 6 through 13 for example, the tensioner comprises a backup member (25)($25_2$) being in contact with the power spring (21) and supporting the power spring by acting an urging force in a direction opposite to a radial shift of the power spring in a direction in which the power spring is wound.

With reference to FIGS. 2 through 10 and to FIGS. 12 and 13 for example, the backup spring (25) includes a leaf spring supporting an inner circumferential surface of the power spring (21) and urging the power spring in a direction of expanding a diameter of the power spring.

Figure 11:
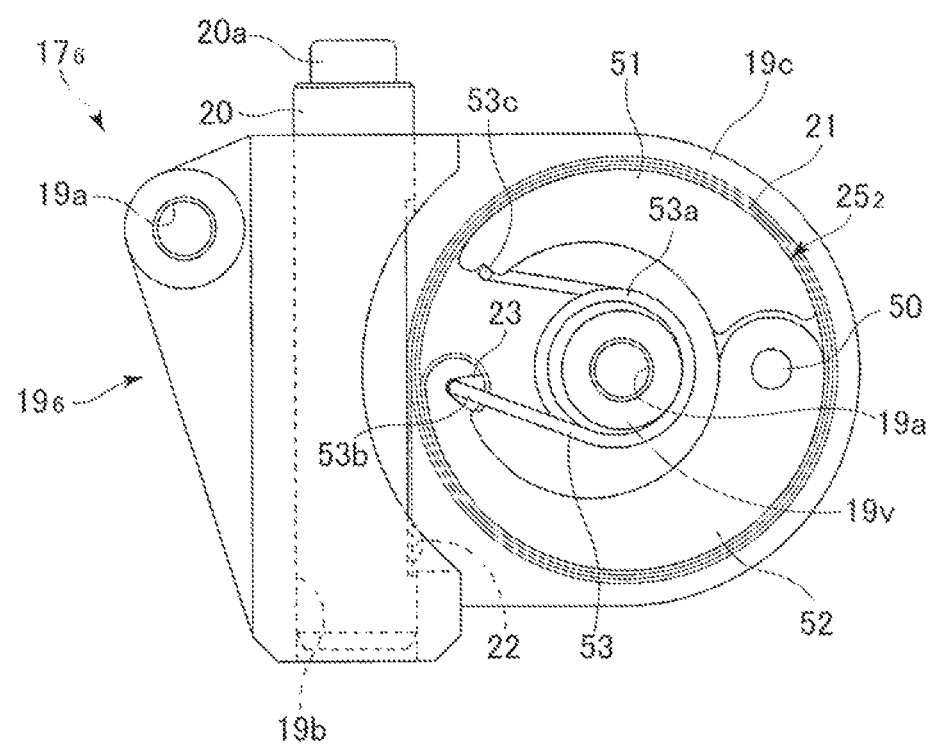
FIG. 11 is a front view illustrating a still different embodiment.

With reference to FIG. 11 for example, the backup member ($25_2$) includes a pair of arms (51, 52) pivoted by a pin (50) at base ends and the pair of arms support an inner circumferential surface of the power spring (21) and urges the power spring in a direction of expanding a diameter of the power spring.

With reference to FIG. 5 for example, a material (21′b) having a function such as a high friction coefficient, wear resistance and suppressing of heat generation is interposed between sheets of the power spring (21′).

With reference to FIGS. 2 and 3 for example, the tensioner comprises a body (19) slidably supporting a plunger (20), wherein the power spring (21) is stored in the body (19) while fixing (22) one end thereof to the plunger (20) and fixing (23) another end to the body, and wherein the one end (20a) of the plunger causes an urging force of the power spring (21) to act between a tension member (16) and a fixing member.

With reference to FIGS. 6A, 6B, 7, 8A, 8B and 13 for example, the tensioner comprises a body ($19_2$, $19_3$, $19_8$) including a fixing portion (19d) and a movable portion (19e) rotatably supported by the fixing portion, wherein the power spring (21) is stored in the body ($19_2$) while fixing (22 or 23) one end thereof to the fixing portion (19d) and fixing (22 or 23) another end to the movable portion (19e), and wherein the movable portion (19e) causes an urging force of the power spring (21) to act between the tension member (16) and the fixing member.

With reference to FIGS. 9A and 9B for example, the tensioner comprises a body ($19_4$) having a fixing portion (19g) and a movable portion (19h) turnably supported by a pin (37) disposed on one side portion of the fixing portion, wherein the fixing portion (19g) and the movable portion (19h) have semi-circular arc shaped storage surfaces (39) (40), respectively, in a state in which the semi-circular arc shaped storage surfaces face with each other and the power spring (21) is mounted in these storage surfaces facing with each other, and wherein the movable portion (19h) causes an urging force of the power spring (21) to act between the tension member (16) and the fixing member.

With reference to FIG. 10 for example, wherein the tensioner comprises a lever (46) swingably supported by the body ($19_5$), and wherein an urging force of the power spring (21) acts on the lever (46) through a first project portion (20a) and the urging force acting on the lever acts on the tension member (16) through a second project portion (47) provided on the lever.

With reference to FIG. 1 for example, the tension member (16) is provided in slidable contact with a loose side of a timing chain (13) wrapped around a sprocket (11a) and a sprocket (12a).

It is noted that the reference numerals described above are indicated to collate with the drawings, they do not affect a configuration described in claims by any means.

The tensioner of the present disclosure can smoothly absorb vibration of a chain or the like by causing an urging force of a power spring to act so as to resist against a load acting from a wrap-around transmission body such as the chain and the belt to a tension member, by buffering the vibration of the chain or the like by unwinding or winding the power spring, by absorbing and damping energy by a hysteresis property caused by differences of inter-plate frictional forces in unwinding and winding directions of the power spring and by preventing tap tones even in a resonance area.

In a case where the chain or the like elongated by an aged deterioration or in a case where the chain or the like is loosened in starting an engine, for example, the power spring shifts in the unwinding direction. Because the inter-plate frictional force is small at this time, it is possible to adjust the chain or the like to an adequate tension by quickly moving the tension member. Even if a large load acts on the tension member from the chain or the like, the power spring shifts to the winding direction in which a large inter-plate frictional force acts to absorb the load. In a case where a large load acting on the tension member from the chain or the like continues, it is possible to prevent excessive tension of the chain or the like from continuing because the power spring is gradually wound up along with the vibration of the chain or the like.

Because the power spring shifts in its original deformation direction of the unwind and winding directions, it facilitates a design of reducing concentrated load and a design having high stress resistance, durability and high load, and is applicable in a wide range.

With the backup member supporting the power spring, a radial shift of the power spring is limited by a supporting force of the backup member in the winding direction and a larger inter-plate frictional force acts, absorbing a load acting on the tension member.

The configuration is simplified by using the leaf spring as the backup member. The configuration becomes strong and durability can be improved by arranging the backup member as a pair of arms whose base end portions are pivoted.

It is possible to apply various functions such as a larger frictional force, wear resistance, suppression of heat generation or the like by interposing a material having such function between the sheets of the power spring.

It is possible to change a load by a lever ratio of a lever by causing an urging force of the power spring to act on a wrap-around transmission body through the lever and to readily adjust a relationship between the urging force of the power spring and the tension force of the wrap-around transmission body. For instance, it is possible to improve durability of a tensioner by setting such that the urging force of the power spring acting on to the wrap-around transmission body becomes small to reduce an inter-plate frictional force of the power spring.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

While the tensioner described above is suitable for adjusting a tension force of a timing chain and is usable in an automobile industry, the tensioner is not limited to those uses and is usable for adjusting a tension force of all kinds of wrap-around transmission bodies.

What is claimed is:

1. A tensioner comprising;
a power spring urging so as to resist a tension member receiving a load from a wrap-around transmission body; and
a backup member being in contact with the power spring and supporting the power spring by acting an urging force in a direction opposite to a radial shift of the power spring in a direction in which the power spring is wound,
wherein the power spring is unwound in a condition in which an inter-plate frictional force of the power spring is small in a case where an urging force acting from the power spring to the tension member is greater than a load acting from the tensioner member to the power spring and the power spring is wound in a condition in which the inter-plate frictional force of the power spring is large in a case where the urging force acting from the power spring to the tension member is smaller than the load acting from the tension member to the power spring.

2. The tensioner according to claim 1, wherein the backup member includes a leaf spring supporting an inner circumferential surface of the power spring and urging the power spring in a direction of expanding a diameter of the power spring.

3. The tensioner according to claim 1, wherein the backup member includes a pair of arms pivoted at their base end portions and the pair of arms supports an inner circumferential surface of the power spring and urges the power spring in a direction of expanding a diameter of the power spring.

4. The tensioner according to claim 1, further comprising a material interposed between sheets of the power spring and having at least one of functions of a high friction coefficient, wear resistance and suppressing of heat generation.

5. The tensioner according to claim 1, further comprising a body slidably supporting a plunger,
wherein the power spring is stored in the body while fixing one end thereof to the plunger and fixing another end to the body, and
wherein the one end of the plunger causes an urging force of the power spring to act between a tension member and a fixing member.

6. The tensioner according to claim 5, further comprises a lever swingably supported by the body,
wherein an urging force of the power spring acts on the lever through a first project portion and the urging force acting on the lever acts on the tension member through a second project portion provided on the lever.

7. The tensioner according to claim 1, further comprising a body including a fixing portion and a movable portion rotatably supported by the fixing portion,
wherein the power spring is stored in the body while fixing one end thereof to the fixing portion and fixing another end to the movable portion, and
wherein the movable portion causes an urging force of the power spring to act between a tension member and a fixing member.

8. The tensioner according to claim 1, further comprising a body having a fixing portion and a movable portion turnably supported by a pivot portion disposed on one side portion of the fixing portion,
wherein the fixing portion and the movable portion have semi-circular arc shaped storage surfaces, respectively, in a state in which the semi-circular arc shaped storage surfaces face with each other and the power spring is mounted in these storage surfaces facing with each other, and
wherein the movable portion causes an urging force of the power spring to act between the tension member and a fixing member.

9. The tensioner according to claim 1, wherein the tension member is provided in slidable contact with a loose side of a timing chain wrapped around a sprocket and a sprocket.

* * * * *